United States Patent
Copeland et al.

(10) Patent No.: US 10,723,588 B2
(45) Date of Patent: Jul. 28, 2020

(54) SYSTEM AND METHOD OF MEASURING AND DIAGNOSING RIDE QUALITY OF AN ELEVATOR SYSTEM

(71) Applicant: Otis Elevator Company, Farmington, CT (US)

(72) Inventors: George Scott Copeland, Wethersville, CT (US); Soumitra Borthakur, Rocky Hill, CT (US); Jinho Song, West Hartford, CT (US); Daniel Rush, Canton, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 401 days.

(21) Appl. No.: 15/553,571

(22) PCT Filed: Feb. 23, 2016

(86) PCT No.: PCT/US2016/019080
§ 371 (c)(1),
(2) Date: Aug. 24, 2017

(87) PCT Pub. No.: WO2016/137960
PCT Pub. Date: Sep. 1, 2016

(65) Prior Publication Data
US 2018/0044134 A1    Feb. 15, 2018

Related U.S. Application Data

(60) Provisional application No. 62/120,068, filed on Feb. 24, 2015.

(51) Int. Cl.
*B66B 5/00* (2006.01)
*B66B 1/34* (2006.01)
*G01P 1/12* (2006.01)

(52) U.S. Cl.
CPC .......... *B66B 5/0025* (2013.01); *B66B 1/3492* (2013.01); *B66B 5/0031* (2013.01); *B66B 5/0037* (2013.01); *G01P 1/127* (2013.01)

(58) Field of Classification Search
CPC ... B66B 1/3415; B66B 5/0025; B66B 1/3461; B66B 5/0037; B66B 5/0087; B66B 5/0006; B66B 5/0018; B66B 25/006
See application file for complete search history.

(56) References Cited

U.S. PATENT DOCUMENTS

| 7,143,001 B2 | 11/2006 | Karasek |
| 8,418,815 B2 | 4/2013 | Carreno et al. |

(Continued)

FOREIGN PATENT DOCUMENTS

| CN | 2506609 Y | 8/2002 |
| CN | 1780780 A | 5/2006 |

(Continued)

OTHER PUBLICATIONS

Ginart, Antonio, Ali, Irfan N., Barlas, Irtaza, Ginart, Antonio A., Sheldon, Jeremy S., Kalgren, Patrick W. and Roemer, Michael J., Smart Phone Machinery Vibration Measurement, IEEEAC paper #1702, Version 2, Updated 2010.

(Continued)

*Primary Examiner* — Marlon T Fletcher
(74) *Attorney, Agent, or Firm* — Cantor Colburn LLP

(57) ABSTRACT

A system and method of measuring and diagnosing the ride quality of an elevator system, including (a) operating the mobile device to acquire ride quality data, (b) operating the mobile device to transmit ride quality data to an external computing device, (c) operating the external computing device to compare the acquired ride quality data to predetermined system data to create performance data, (d) operating the external computing device to perform a ride (Continued)

quality diagnostics based at least in part on the performance data, and (e) operating the external computing device to transmit the ride quality diagnostics to the mobile device.

19 Claims, 2 Drawing Sheets

(56) References Cited

U.S. PATENT DOCUMENTS

| | | | |
|---|---|---|---|
| 8,560,267 B2 | 10/2013 | Jangle et al. | |
| 8,718,672 B2 | 5/2014 | Xie et al. | |
| 8,886,921 B2 | 11/2014 | Rubin et al. | |
| 2004/0206583 A1* | 10/2004 | Mearns | B66B 5/0006 187/391 |
| 2011/0168496 A1* | 7/2011 | Bunter | B66B 5/0025 187/247 |
| 2013/0035893 A1 | 2/2013 | Grokop et al. | |
| 2014/0330535 A1 | 11/2014 | Van Den Heuvel et al. | |

FOREIGN PATENT DOCUMENTS

| | | |
|---|---|---|
| CN | 101470426 A | 7/2009 |
| CN | 102134027 A | 7/2011 |
| CN | 107257770 A | 10/2017 |
| EP | 2263533 A1 | 12/2010 |
| JP | 2005247470 | 9/2005 |
| JP | 2006117435 A | 5/2006 |
| WO | 99/53587 A1 | 9/1999 |
| WO | 2014/131656 A1 | 9/2014 |

OTHER PUBLICATIONS

Physics Toolbox Accelerometer—Android Apps on Google Play Brochure.
Usman, Bilal Aftab and Anwar, Muhammad Sabieh, Smart Physics—Introduction to Data Acquisition and Processing, Version 1, Aug. 30, 2014, Syed Babar Ali School of Science and Engineering, LUMS.
Pioneering Application by Kleeman for the IPhone4 Brochure, Oct. 17, 2011.
European Patent Office, International Search Report, dated Jun. 6, 2016.
European Patent Office, Written Opinion of the International Searching Authority, dated Jun. 6, 2016.
Chinese First Office Action and Search Report for application CN 201680011720.5, dated Oct. 15, 2018, 11 pages.
Japanese Office Action for application JP 2017-562960, dated Dec. 2, 2019, (translation) U321254JP, 5 pages.

* cited by examiner

SYSTEM AND METHOD OF MEASURING AND DIAGNOSING RIDE QUALITY OF AN ELEVATOR SYSTEM

CROSS REFERENCE TO RELATED APPLICATIONS

The present application is a U.S. national stage of, and claims the priority benefit of, International Patent Application Serial No. PCT/US2016/019080, filed Feb. 23, 2016 and also claims the priority benefit of U.S. Provisional Patent Application Ser. No. 62/120,068 filed Feb. 24, 2015, the contents of which are hereby incorporated in their entirety into the present disclosure.

TECHNICAL FIELD OF THE DISCLOSED EMBODIMENTS

The presently disclosed embodiments generally relate to elevator systems and more particularly, to a system and method of measuring and diagnosing ride quality of an elevator system

BACKGROUND OF THE DISCLOSED EMBODIMENTS

Generally, elevator noise and vibration experts are frequently able to troubleshoot and diagnose issues within an elevator system by using recorded data and product knowledge. Typically, this has required sending knowledgeable field personnel to an elevator site with expensive, large, professional sound and vibration management equipment. There is therefore a need for a system and method for measuring, diagnosing and troubleshooting elevator system issues with smaller and cost effective equipment.

SUMMARY OF THE DISCLOSED EMBODIMENTS

In one aspect a system for measuring and diagnosing ride quality of an elevator system is provided. The system includes an elevator system including an elevator car and a mobile device. The elevator system is configured to command the elevator car to travel throughout a hoistway. The mobile device is configured to operate a program stored in memory, wherein the mobile device measures a first signal, measures a second signal, and displays a diagnostic message based at least in part on the first signal and the second signal. The mobile device also includes a first detector configured to measure the first signal. In one embodiment, the first detector includes an accelerometer configured to measure vibration. The mobile device further includes a second detector configured to measure the second signal. In one embodiment, the second detector includes a device for measuring sound.

The system further includes an external computing device in communication with the mobile device, wherein the mobile device and the external computing device are configured to exchange data therebetween. In one embodiment, the mobile device is in wireless communication with the external computing device.

In one aspect, a method of measuring and diagnosing the ride quality of an elevator system is provided. The method includes the step of operating a mobile device to select an elevator configuration from a plurality of elevator configurations, and operating the mobile device to acquire ride quality data. In one embodiment, operating the mobile device to acquire ride quality data includes commanding the elevator car to travel a distance, and placing the mobile device onto an interior surface of the elevator car. In one embodiment, the ride quality data includes noise data and vibration data.

In one embodiment, the method includes step of operating the mobile device to determine whether the ride quality data is acceptable. If the acquired ride quality data is acceptable, the method proceeds to the step of operating the mobile device to transmit the acquired ride quality data to an external computing device.

The method further includes the steps of operating the external computing device to perform a ride quality diagnostics based at least in part on the performance data, and operating the external computing device to transmit the ride quality diagnostics to the mobile device.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
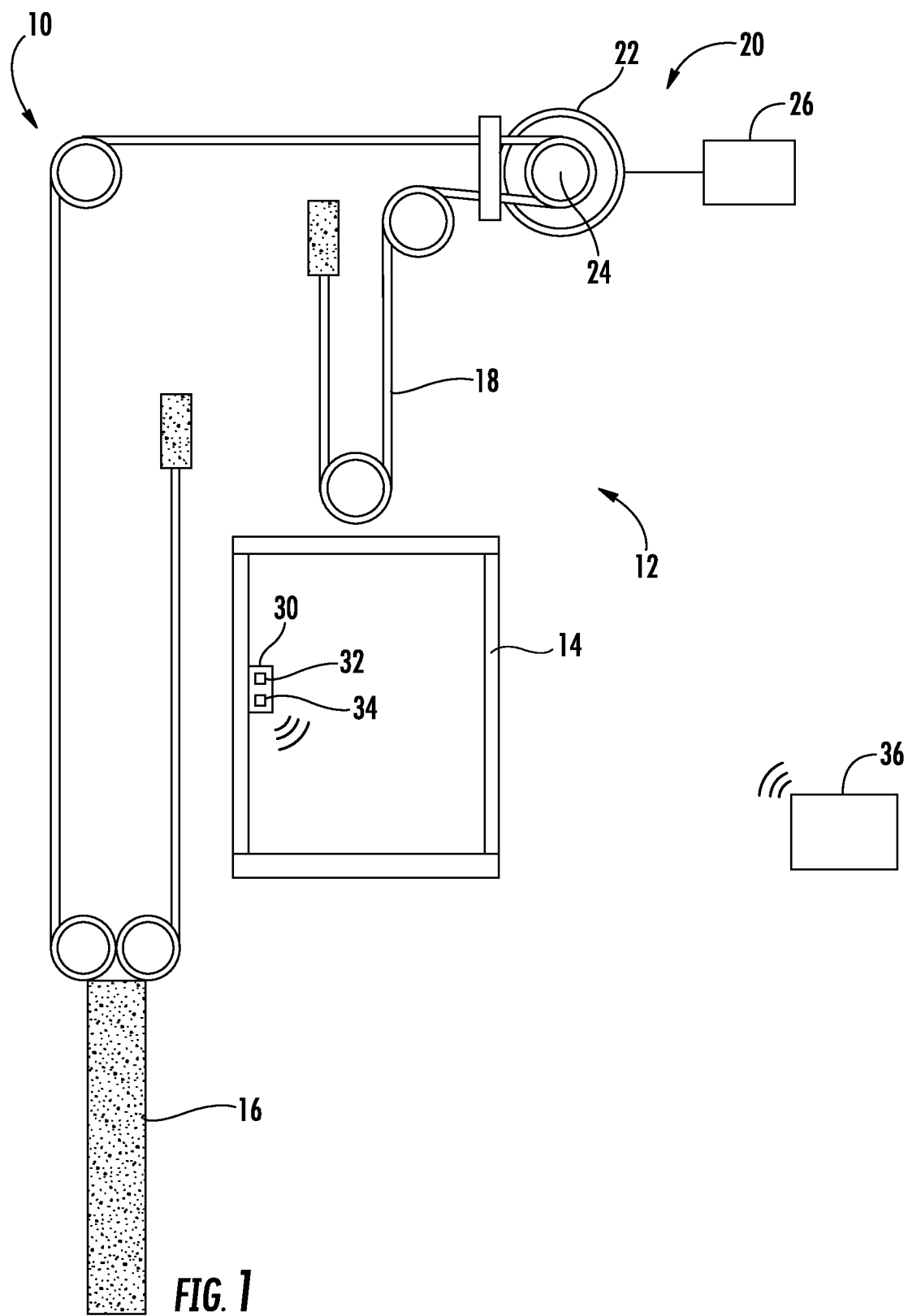
FIG. 1 illustrates a schematic drawing of a system for measuring and diagnosing ride quality of an elevator system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a system for measuring and diagnosing ride quality of an elevator system 12, generally indicated at 10. The elevator system 12 includes an elevator car 14 and counterweight 16. A roping arrangement 18 (e.g., round ropes or flat belts) supports the weight of the elevator car 14 and counterweight 16 in a known manner. An elevator machine 20 includes a motor 22 associated with a traction sheave 24. The motor 22 selectively causes movement of the traction sheave 24 to cause corresponding movement of the roping arrangement 18 to control the position and movement of the elevator car 14 within a hoistway. Under some conditions, for example, the weight of the counterweight 16 can be relied upon to cause the elevator car 14 to rise within the hoistway as the counterweight 16 is allowed to descend. The example elevator machine 20 includes a drive portion 26 for providing electrical power to the motor 22.

The system 10 further includes a mobile device 30. It will be appreciated that the mobile device 30 may be any mobile device operable to perform the functions disclosed herein, for example, a mobile telephone, tablet device, or any device capable of being carried by a person outside of a home, or other structure, to name a few non-limiting examples. The mobile device 30 is configured to operate a program stored in memory (not shown), wherein the mobile device 30 measures a first signal, measures a second signal, and displays a diagnostic message based at least in part on the first signal and the second signal. The mobile device 30 includes a first detector 32 configured to measure the first signal. In one embodiment, the first detector 32 includes an accelerometer configured to measure vibration. The mobile device 30 further includes a second detector 34 configured to measure the second signal. In one embodiment, the second detector 34 includes a device for measuring sound, for example a microphone. The mobile device 30 is in communication with an external computing device 36, and the mobile device 30 and the external computing device 36 are configured to exchange data therebetween. In one embodiment, the mobile device 30 is in wireless communication with the external computing device 36. It will be appreciated that the external computing device 36 may include a web server to name one non-limiting example.

Figure 2:
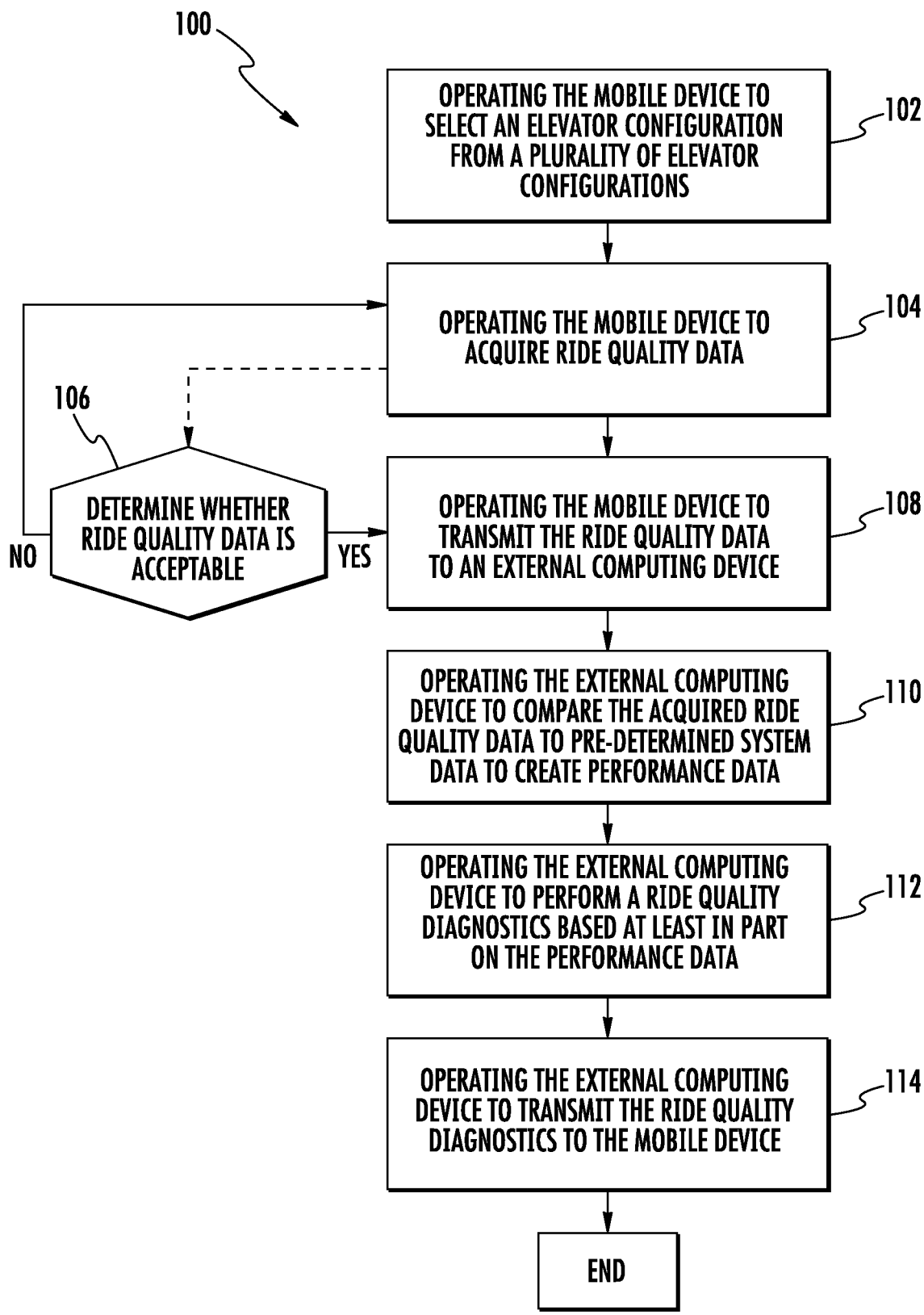
FIG. 2 illustrates a schematic flow diagram of a method for measuring and diagnosing ride quality of an elevator system.

FIG. 2 illustrates a method, generally indicated at 100, of measuring and diagnosing the ride quality of an elevator system 12 utilizing the system 10 as described herein. The method 100 includes the step 102 of operating the mobile device 30 to select an elevator configuration from a plurality of elevator configurations. For example, a user may be prompted by the program stored in the memory of the mobile device 30 to identify the specific model of elevator system 12 via a series of drop down menus.

The method 100 further includes the step 104 of operating the mobile device 30 to acquire ride quality data. In one embodiment, operating the mobile device 30 to acquire ride quality data includes commanding the elevator car 14 to travel a distance, and placing the mobile device 30 onto an interior surface of the elevator car 14. In one embodiment, the ride quality data includes noise data and vibration data. For example, the user sends a signal to the drive portion 26 requesting that the elevator car 14 travel in either the up direction or the down direction. The user then places the mobile device 30 on an interior surface of the elevator car 14. The first detector 32 measures the vibration of the elevator car 14 and the second detector 34 measures the sound within the hoistway as the elevator car 14 travels in the desired direction.

In one embodiment, the method includes step 106 of operating the mobile device 30 to determine whether the ride quality data is acceptable. For example, after the mobile device 30 measures the vibration, the acquired ride quality data may be presented on the mobile device 30 for viewing by the user. The user may then have the option of accepting or rejecting the acquired ride quality data. If the acquired ride quality data is rejected, the user repeats step 104 of acquiring ride quality data.

If the acquired ride quality data is acceptable, the method proceeds to step 108 of operating the mobile device 30 to transmit the acquired ride quality data to an external computing device 36. The mobile device 30 transmits the acquired ride quality data to the external computing device 36 to perform step 110 of comparing the acquired ride quality data to pre-determined system data to create performance data. For example, the program is loaded with pre-determined system data, such as acceptable noise and vibration data, based on a particular elevator configuration. The external computing device 36 compares the acquired ride quality data from the mobile device 30 with the pre-determined system data to determine whether the acquired ride quality data is within an acceptable tolerance level of the pre-determined system data.

The method 100 further includes the step 112 operating the external computing device 36 to perform a ride quality diagnostics based at least in part on the performance data. For example, if the acquired ride quality data is outside the acceptable tolerance level of the pre-determined system data, the external computing device 36 analyzes the acquired ride quality data and identifies potential issues. For example, a poorly-aligned rail joint approximately 25 meters (approximately 82 feet) above the lower landing, and/or noise from a defective idler sheave bearing to name a couple of non-limiting examples, with the ride quality of the elevator car 14.

The method 100 further includes the step 114 of operating the external computing device 36 to transmit the ride quality diagnostics to the mobile device 30. For example, after the external computing device 36 has identified potential issues, the external computing device 36 transmits the information, in an easy to read format, to the mobile device 30. This provides the user with near immediate, relevant information to identify components and functions of the elevator system 12 associated with the undesired noise or vibration in order to improve the ride quality.

It will therefore be appreciated that present embodiments provide for a system 10 and method 100 to acquire ride quality data with a mobile device 30, and perform ride quality diagnostics on an external computing device 36, and provide the ride quality diagnostics to a user via a mobile device 30 in order to improve the efficiency of field personnel when maintenance is required of the elevator system 12.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of measuring and diagnosing the ride quality of an elevator system, including an elevator car, via a computer application stored on a mobile device, the method comprising:
   acquiring ride quality data with the mobile device;
   transmitting ride quality data to an external computing device with the mobile device;
   comparing the acquired ride quality data to pre-determined system data to create performance data;
   determining a ride quality diagnostics based at least in part on the performance data; and
   wherein the acquiring ride quality data further comprises operating the mobile device to select an elevator configuration from a plurality of predetermined elevator configurations.

2. The method of claim 1, wherein the mobile device is in wireless communication with the external computing device.

3. The method of claim 1, wherein the ride quality data comprises noise data and vibration data.

4. The method of claim 1, wherein comparing the acquired ride quality data to pre-determined system data further comprises commanding the elevator car to travel a distance, and placing the mobile device onto an interior surface of the elevator car.

5. The method of claim 1, wherein comparing the acquired ride quality data to pre-determined system data further comprises operating the mobile device to determine whether the ride quality data is acceptable.

6. The method of claim 1 wherein selecting the elevator configuration comprises manually selecting the elevator configuration via the mobile device.

7. The method of claim 1 further comprising transmitting the ride quality diagnostics to the mobile device.

8. A system for measuring and diagnosing ride quality of an elevator system comprising:
- an elevator system, the elevator system including an elevator car;
- a mobile device located within the elevator car, the mobile device configured to measure ride quality data; and
- an external computing device in communication with the mobile device;
- wherein the mobile device is configured to select an elevator configuration from a plurality of predetermined elevator configurations, acquire and transmit ride quality data.

9. The system of claim 8, wherein the external computing device is further configured to compare the acquired ride quality data to pre-determined system data.

10. The system of claim 8, wherein the mobile device comprises a first detector configured to measure a first signal, and a second detector configured to measure a second signal.

11. The system of claim 10, wherein the first detector comprises an accelerometer and the second detector comprises a device for measuring sound.

12. The system of claim 10, wherein the first signal comprises vibration, and the second signal comprises noise.

13. The system of claim 8, wherein the mobile device is in wireless communication with the external computing device.

14. The system of claim 8, wherein the ride quality data comprises noise data and vibration data.

15. The system of claim 8, wherein the mobile device is placed onto an interior surface of the elevator car.

16. The system of claim 8 wherein the mobile device is configured for manually selecting the elevator configuration.

17. The system of claim 8 wherein the external computing device is configured to transmit ride quality diagnostics to the mobile device.

18. A method of measuring and diagnosing the ride quality of an elevator system, including an elevator car, the method comprising:
- selecting an elevator configuration from a plurality of predetermined elevator configurations;
- acquiring ride quality data with the mobile device;
- transmitting ride quality data to an external computing device with the mobile device;
- comparing the acquired ride quality data to pre-determined system data to create performance data, wherein the pre-determined system data is based on the selected elevator configuration;
- determining a ride quality diagnostics based at least in part on the performance data; and
- transmitting the ride quality diagnostics to the mobile device.

19. A system for measuring and diagnosing ride quality of an elevator system comprising:
- a mobile device located within an elevator car, the mobile device configured to measure ride quality data; and
- an external computing device in communication with the mobile device, the external computing device configured to transmit ride quality diagnostics to the mobile device;
- wherein the mobile device is configured to select an elevator configuration from a plurality of predetermined elevator configurations, acquire ride quality data and transmit the ride quality data; and
- wherein the external computing device is further configured to compare the acquired ride quality data to pre-determined system data, wherein the pre-determined system data is based on the selected elevator configuration.

* * * * *